UNITED STATES PATENT OFFICE.

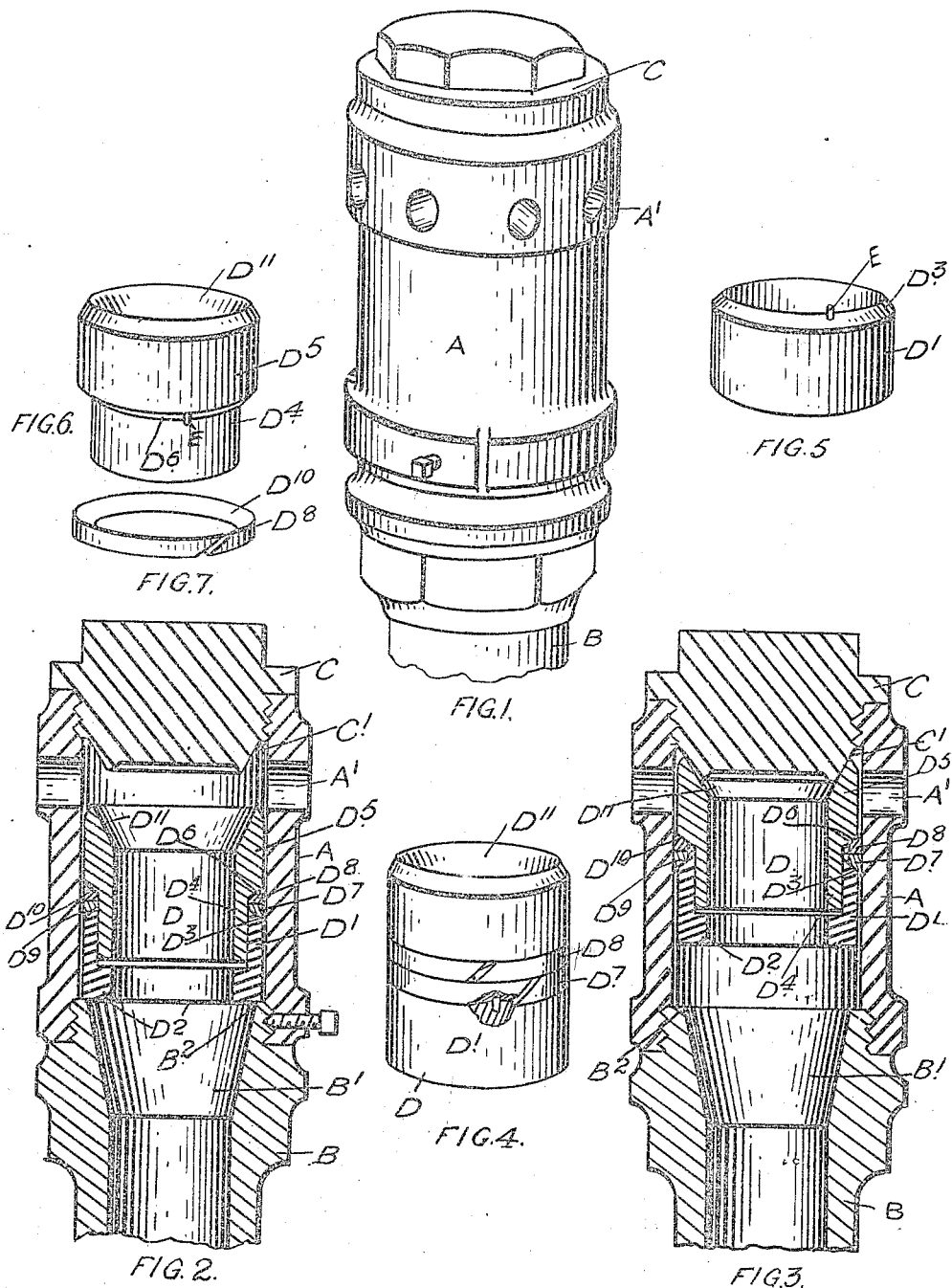

JAMES McCLUSKEY, OF NORTH BAY, ONTARIO, CANADA.

RELIEF-VALVE FOR LOCOMOTIVES.

1,045,307.  Specification of Letters Patent.  Patented Nov. 26, 1912.

Application filed February 23, 1912. Serial No. 679,437.

*To all whom it may concern:*

Be it known that I, JAMES McCLUSKEY, of the town of North Bay, in the district of Nipissing, in the Province of Ontario, Canada, have invented certain new and useful Improvements in Relief-Valves for Locomotives, of which the following is the specification.

My invention relates to improvements in relief valves for locomotives and the object of the invention is to devise a simple and cheap form of valve of this class which will be absolutely steam tight and which will have no parts liable to breakage or to otherwise get out of order and also a valve which will be noiseless in its operation.

Figure 1, is a general perspective view of my relief valve. Fig. 2, is a sectional view through the valve showing the piston valve in the normal position. Fig. 3, is a similar view to Fig. 2, showing the piston valve in the raised or closed position. Fig. 4, is a perspective view of a detail of the piston valve. Fig. 5, is a perspective view of a detail of the lower member of the piston valve. Fig. 6, is a similar view of the upper member of the piston valve. Fig. 7, is a perspective view of a detail of one of the intermediately split rings.

In the drawings like letters of reference indicate corresponding parts in each figure.

A is the valve casing having a series of orifices A' extending through the wall thereof and in proximity to the top of the casing.

B is the steam inlet pipe provided with a flaring internal portion B'. The pipe B is threaded into the lower end of the casing A and the internal diameter at the end of the pipe is slightly smaller than the internal diameter of the casing A thereby forming an annular shoulder $B^2$ in proximity to the lower end of the casing A.

C is a cap which is threaded into the upper end of the casing and is provided with a tapered seat C' extending into the top of the casing as indicated in Figs. 2 and 3.

D is my piston valve comprising the lower member D' annular in form and provided with an internal annular shoulder $D^2$ at its lower end and the wall thereof beveled inwardly at $D^3$ at its upper end.

$D^4$ is the upper member of the valve piston which is also annular in form and is of such diameter as to fit at its lower end within the lower member D'. The upper end of the member $D^4$ is provided with an enlargement $D^5$ provided with a bevel portion $D^6$ extending between the enlargement and the lower portion of the member.

$D^7$ and $D^8$ are split rings provided with inclined internal walls $D^9$ and $D^{10}$ fitting against the inclined portions $D^3$ and $D^6$ of the upper and lower members D' and $D^4$ respectively, and so that the flat faces of the rings abut each other as indicated. The member $D^4$ is also provided with an internal tapered seat $D^{11}$ designed to fit the seat C' when the piston valve is raised to its upper position as indicated in Fig. 3. It will also be seen on referring to Fig. 3 that the orifices A' are closed by the piston valve when in its raised position.

It will be understood that when the engine is what is termed drifting or running without steam air is drawn through the orifices A' and through the center of the valve into the cylinder. Immediately however, the engine is put under steam the steam enters the valve casing through the pipe B expanding outwardly in the flaring portion B' of the pipe and striking against the portion of the valve piston $D^2$ overhanging the shoulder $B^2$ so as to raise the piston valve and bring the seat $D^{11}$ thereof against the seat C' thereby closing the valve. As soon as the portion $D^{11}$ is seated on the portion C' the steam pressure serves to force the lower member of the piston valve upwardly over the reduced or main portion of the members $D^4$ thereby carrying the beveled portions $D^3$ and $D^6$ toward each other against the inclined faces of the spring rings $D^7$ and $D^8$ and forcing them to expand outwardly against the internal face of the wall of the valve cylinder casing. It will also be understood that when steam is turned on to the engine a certain amount will pass through the valve into the upper portion of the casing before it closes and will form a cushion preventing any noise caused by the valve striking its seat when closing. The same effect occurs when steam is turned off and a certain amount of steam remains beneath the valve piston thereby cushioning it as it drops onto the shoulder $B^2$.

To prevent the splits in the split rings coming into alinement and thereby allowing the steam to leak through the splits into the upper part of the valve casing I provide dowel pins E extending from each of the members of the piston valve into corresponding recesses formed in the split rings. This will prevent the split rings turning and hold them in a definite position preventing the splits thereof coming into alinement.

From this description it will be seen that I have devised a very simple form of relief valve for locomotives which will be noiseless in its operation, absolutely steam tight, having no parts liable to break or otherwise get out of order and which will be cheap to manufacture.

What I claim as my invention is.

1. A relief valve for locomotives comprising a cylindrical casing having a closed upper end having orifices located in the wall of the casing in proximity to the upper end thereof, and held on a steam inlet pipe leading into the lower end of the casing, a valve seat located at the upper end of the casing, a piston valve having an orifice extending through the center thereof and designed to seat itself at its upper end on the valve seat of the casing when forced upwardly by steam pressure, and expansible members inserted in the wall of the valve piston and designed to expand outwardly against the interior wall of the valve cylinder casing as the valve piston is seated as and for the purpose specified.

2. A relief valve for locomotives comprising a cylindrical casing having a closed upper end having a valve seat formed on the interior face thereof and having orifices in proximity to the closed upper end of the casing, a steam pipe extending into the lower end of the casing so as to form an interior annular shoulder, a divided valve piston normally supported upon the shoulder and having a central orifice extending therethrough, and a valve seat at its upper end designed to seat itself upon the seat of the valve casing when steam pressure is exerted upon the lower face of the valve and expansible members inserted in the wall of the valve piston and expanded by forcing the divided members of the valve together, as and for the purpose specified.

3. In a relief valve for locomotive engines a cylindrical casing having a closed upper end having a valve seat on its interior face and having orifices extending through the wall of the cylinder in proximity to such closed end, a steam pipe entering the lower end of the casing and forming an annular interior shoulder, a divided valve piston, one member being formed cup-shape and having a central orifice, and an outwardly beveled upper edge, the other member extending at its lower end into the cup-shape member and fitting the same, and having a central orifice registering with the orifice of the lower member, and an enlarged upper end of the same outer diameter as the outer diameter of the lower member, an outwardly beveled portion located between the enlarged upper portion and the lower portion extending into the lower valve member, and a pair of split rings inserted between the aforesaid opposing beveled faces and having corresponding beveled faces whereby the split rings are expanded outwardly as the upper and lower members of the valve are forced together by steam pressure exerted against the lower end of the valve as the valve is seated on the seat of the valve casing, as and for the purpose specified.

4. In a device of the class described, the combination with the valve casing having a valve seat at its upper end, of a divided valve piston, split spring rings inserted within the wall of the piston and designed to be forced upwardly against the wall of the casing by pressure upon the lower end of the valve, as and for the purpose specified.

5. In a device of the class described, a divided piston valve comprising the lower cup-shaped portion having an outwardly beveled upper edge, an upper portion fitting at its lower end within the lower portion and terminating in an outwardly beveled face leading into an enlargement, and a pair of abutting split rings having correspondingly beveled faces and fitting between the opposing beveled faces of the piston valve members, as and for the purpose specified.

6. In a device of the class described, a piston valve comprising a lower cup-shaped member having a central orifice and a beveled upper edge, an upper member fitting within the cup-shaped member and having an outwardly beveled face extending into an enlargement and a central orifice registering with the orifice of the lower member, and abutting split rings having faces beveled correspondingly to the beveled faces of the valve members and fitting therebetween as and for the purpose specified.

7. In a device of the class described, a divided piston valve comprising the lower cup-shaped portion having an outwardly beveled upper edge, an upper portion fitting at its lower end within the lower portion and terminating in an outwardly beveled face leading into an enlargement, and a pair of abutting split rings having correspondingly beveled faces and fitting between the opposing beveled faces of the piston valve members, and dowel pins extending from the valve members into orifices in the split rings, as and for the purpose specified.

8. In a relief valve for locomotives, the combination with the valve casing having a closed upper end having a valve seat on its interior face, and having orifices extending through the walls of the valve casing in proximity to its upper closed end, a steam pipe entering the lower end of the valve casing and having an outwardly flaring mouth and forming an annular shoulder around the interior of the valve, a valve piston normally resting upon the shoulder and expansible means inserted within the wall of the valve piston and designed to be forced outwardly by pressure against the wall of the casing below the aforesaid orifices as the valve is seated by pressure against the seat of the casing as and for the purpose specified.

JAMES McCLUSKEY.

Witnesses:
    GLADYS BURN,
    HULDA KEATS.